UNITED STATES PATENT OFFICE.

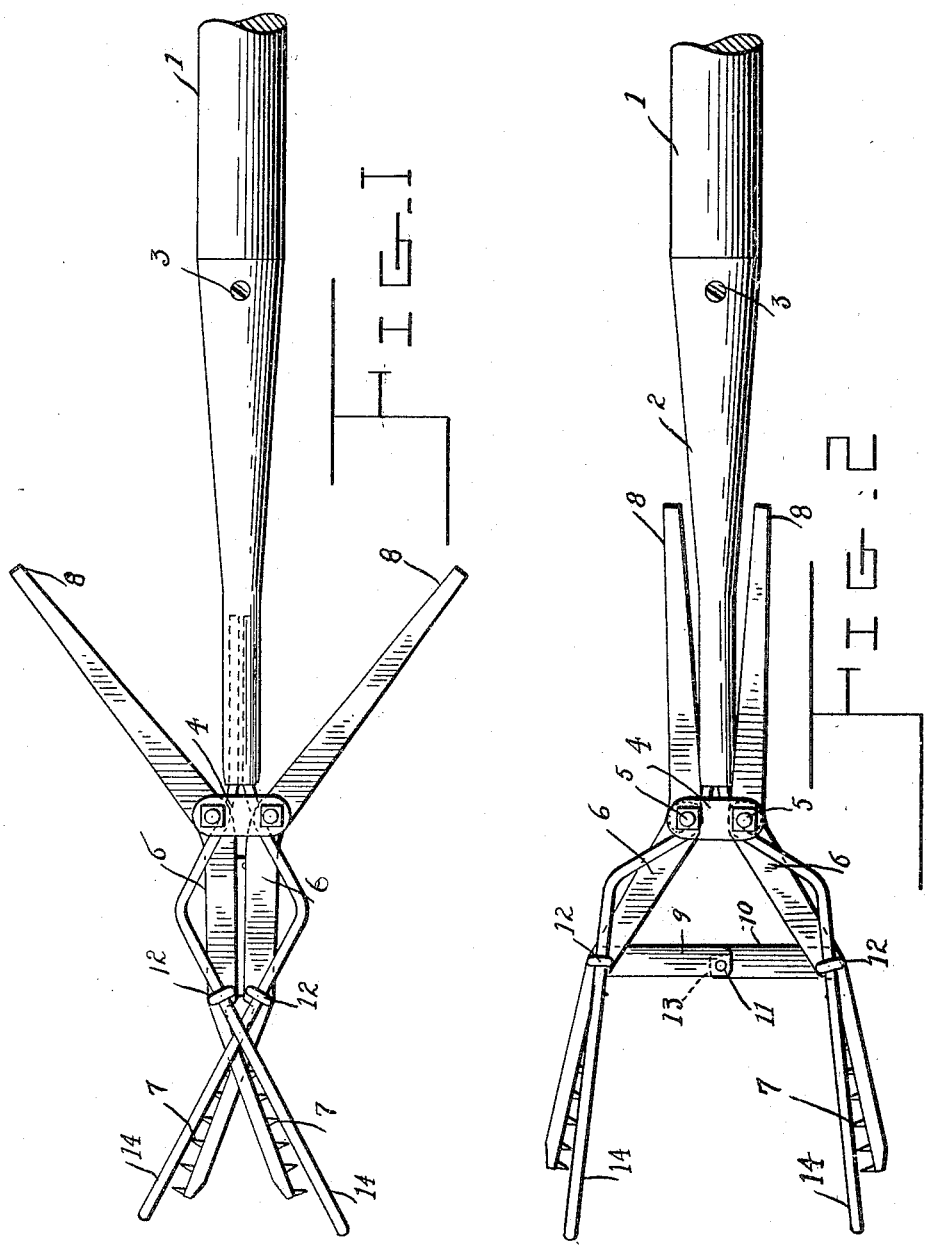

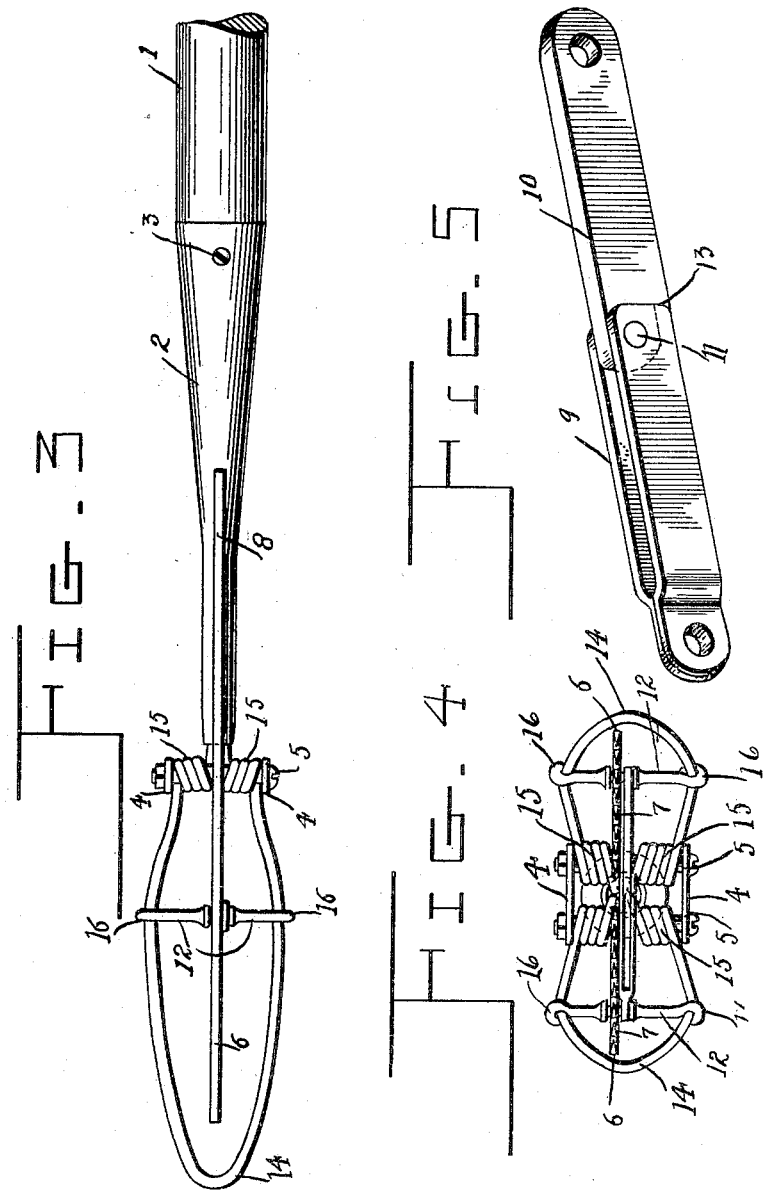

OVILA SIRARD, OF COBALT, ONTARIO, CANADA.

FISH-HOOK.

1,206,733. Specification of Letters Patent. Patented Nov. 28, 1916.

Application filed June 17, 1916. Serial No. 104,259.

*To all whom it may concern:*

Be it known that I, OVILA SIRARD, a subject of the King of Great Britain, residing at Cobalt, Province of Ontario, Canada, have invented certain new and useful Improvements in Fish-Hooks; and I do hereby declare that the following is a full, clear, and exact description of the invention, such as will enable others skilled in the art to which it appertains to make and use the same.

The present invention relates to fish-hooks and has for its object to provide a hook or snare for catching large fish and securely holding the same but at the same time preventing the fish from becoming torn or otherwise mutilated.

With the above and other objects in view which will hereinafter appear as the description continues, the invention consists of the novel features of construction and the formation of parts as will be hereinafter more fully described and particularly pointed out in the appended claims.

In the accompanying drawings is shown the simple and preferred form of the invention it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

In the accompanying drawings; Figure 1 is a plan view of the hook showing the locking jaws thereof when closed; Fig. 2 is a similar view showing the position of the locking jaws when set to trap or snare the fish; Fig. 3 is a side elevation of the same; Fig. 4 is a front elevation; and, Fig. 5 is a detail perspective view of the toggle levers.

Referring now to the accompanying drawings wherein like and corresponding parts are designated by similar reference characters throughout the several views, the numeral 1 indicates a pole or similar member to which the hook my be connected and secured to the outer end of this pole is a sleeve 2 which may be connected to the pole by means of the set screws 3. Spaced from the outer end of the sleeve 2 are a pair of parallel plates 4 which are connected by means of the cross bars 5. Pivotally connected to the cross bars 5 are the hooked levers 6 having formed in the outer ends thereof the teeth 7 and the opposite ends of these levers are provided with handles 8. Connecting the levers 6 are the toggle levers 9 and 10 which are pivotally connected together as at 11 and their outer ends are connected to the cross bars 12 carried by the levers 6. The link 9 of the toggle levers is formed from a piece of sheet metal having the parallel side walls and a bottom wall, whereas the other link 10 is formed from a single flat sheet of metal having one end thereof cut away providing a shoulder 13 upon which rests the bottom wall of the link 9 when the jaws of the device are opened so as to provide a stop to prevent the jaws from closing when they have once been opened but when the pivot 11 of the links has been thrown past center the jaws may be readily closed.

Encircling each of the jaws are the guards 14 and each guard comprises a continuous strand of wire. The extremities of these guards project within the sleeve 2 thereby providing a means of connection between the hook or trap and the sleeve 2. Each of these strands of wire are coiled about the rods 5 as at 15 forming a spring for normally holding the jaws of the trap together or as shown in Fig. 1 of the drawings. The medial portions of each strand of wire forming the guards extend around the jaws 7 and are held in spaced relation thereto by being connected to the eyelets 16 formed within the outer ends of the rods 12. As better shown in Figs. 1 and 2 the guards 14 project in a plane a little in advance of the teeth 7 so that the teeth will only slightly engage the fish which is being caught to prevent the same from tearing or otherwise mutilating the fish, whereas the guards 14 not only provide means for protecting the fish or object to be held between the jaws from the teeth 7 but also provide gripping members for catching the fish.

In applying the hook to use the jaws are opened by manually forcing the levers 8 toward the handle to which they are connected and the toggle levers 9 and 10 will be swung out to the position as shown in Fig. 2 or at dead center thereby preventing the levers from being closed until the toggle levers have come in contact with an object which is to be caught between the jaws whereby in bringing the toggle levers in contact with the object they will be swung upon their pivot 11 and past dead center whereby the coiled springs 15 will cause the gripping jaws to close and firmly grip the fish or other objects to be caught between the jaws.

Having thus fully described my invention, what I claim as new and desire to secure by Letters Patent is:—

1. A hook of the character described comprising a pair of gripping jaws, guards encircling said jaws, means for connecting said guards to said jaws, toggle links for holding said jaws in open position and means for closing said jaws when said toggle links have been released.

2. A hook of the character described comprising a pair of gripping jaws, levers carried by said jaws, guard members encircling each of said jaws and connected thereto, means for normally holding said jaws closed and toggle levers connecting said jaws for the purpose set forth.

3. A hook of the character described comprising a sleeve, a pair of rods supported upon said sleeve, a gripping jaw pivotally connected to each rod, coiled springs encircling said rods, guard members carried by said coiled springs and means for connecting said guard members to the gripping jaws.

4. A hook of the character described comprising a sleeve, a pair of rods, gripping jaws pivotally connected to said rods, teeth formed within one end of said gripping jaws, a handle formed with the opposite end of each of said gripping jaws, coiled springs encircling said rods, one end of said coiled springs being connected to said sleeve, the opposite ends of said coiled springs encircling said gripping jaws for forming guard members, and means for connecting said guard members to the gripping jaws for the purpose set forth.

5. A hook of the character described comprising a support, a pair of jaws pivotally connected to said support, guard members connected to said jaws, resilient connections between said support and said guard members for normally holding said jaws in closed position and means adapted to retain the jaws in open position against the tension of said resilient connections for the purpose set forth.

In witness whereof I have hereunto set my hand.

OVILA SIRARD.

Witnesses:
JOHN LANTHIER,
COLIDE ST. PIERRE.

Copies of this patent may be obtained for five cents each, by addressing the "Commissioner of Patents, Washington, D. C."